United States Patent
Aoyama

(10) Patent No.: US 7,405,503 B2
(45) Date of Patent: Jul. 29, 2008

(54) PERMANENT MAGNET ROTATING ELECTRIC MACHINE

(75) Inventor: Yasuaki Aoyama, Echizen (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 11/560,163

(22) Filed: Nov. 15, 2006

(65) Prior Publication Data
US 2007/0108861 A1    May 17, 2007

(30) Foreign Application Priority Data
Nov. 15, 2005    (JP)    ............... 2005-330348

(51) Int. Cl.
*H02K 21/12*    (2006.01)
(52) U.S. Cl. ............... 310/156.53; 310/156.56
(58) Field of Classification Search ............ 310/156.53, 310/156.01, 156.12, 156.56
See application file for complete search history.

(56) References Cited

U.S. PATENT DOCUMENTS

| 6,703,743 B2 * | 3/2004 | Kaneko et al. | ......... 310/156.38 |
| 6,849,981 B2 * | 2/2005 | Kojima et al. | ......... 310/156.43 |

FOREIGN PATENT DOCUMENTS

| JP | 11004555 A | * | 1/1999 |
| JP | 2000228838 A | * | 8/2000 |
| JP | 2000324736 A | * | 11/2000 |
| JP | 2001016808 A | * | 1/2001 |
| JP | 2001086671 A | * | 3/2001 |
| JP | 2001251796 A | * | 9/2001 |
| JP | 2003070214 A | * | 3/2003 |
| JP | 2003134750 A | * | 5/2003 |
| JP | 2003164085 A | * | 6/2003 |
| JP | 2004096868 A | * | 3/2004 |
| JP | 2005261169 A | * | 9/2005 |
| JP | 2005312153 A | * | 11/2005 |

* cited by examiner

*Primary Examiner*—Thanh Lam
(74) *Attorney, Agent, or Firm*—Alston & Bird LLP

(57) ABSTRACT

The present invention provides a rotating electric machine in which damage to a magnet from heat is prevented, eddy current loss is reduced while decreasing an eddy current generated in a permanent magnet, and furthermore, time and cost for manufacturing can be reduced. The present invention provides a permanent magnet rotating electric machine comprising a stator having a plurality of salient stator poles wound with windings; and a rotor separated from the stator by a rotation air gap and held rotatably, wherein the rotor may comprise a rotor iron core having therein a plurality of permanent magnet insertion holes annularly arranged side by side at a distance from one another in a circumferential direction of the rotor; and permanent magnets inserted into the plurality of permanent magnet insertion holes such that the permanent magnets in the insertion holes adjacent to each other along the circumferential direction of the rotor have different magnetic pole directions from each other, and wherein the permanent magnets each may comprise a plurality of magnet pieces arranged side by side and may have a structure in which nothing is interposed between the magnet pieces.

6 Claims, 4 Drawing Sheets

PERMANENT MAGNET ROTATING ELECTRIC MACHINE

BACKGROUND OF THE INVENTION

1. Field of the Invention

The present invention relates to permanent magnet rotating electric machines.

2. Description of the Related Art

It is known that the efficiency of rotating electric machines can be increased by using permanent magnets to generate a field magnetic flux. Recently, the magnetic flux density in an air gap has been increased by using magnets with enhanced properties, so that it is possible to configure an efficient and compact rotating electric machine. Moreover, with enhancement of the properties of magnets and advancement of technologies, the range of the use of permanent magnet rotating electric machines has been increased, and permanent magnets with enhanced properties have become used even in rotating electric machines for high-speed rotation and large-sized rotating electric machines.

Magnets with enhanced properties have high electrical conductivity, and it has been a problem in that in high-speed or large-sized rotating electric machines, a decrease in efficiency is caused by an eddy current generated in magnets. In order to solve this problem, Japanese patent application Unexamined publication No. H11-4555A/1999 describes a rotating electric machine in which an eddy current in a permanent magnet is decreased by interposing insulating materials between electrically conductive permanent magnet materials having enhanced properties.

However, with the technique described in the above prior art, the difference in the coefficient of thermal expansion between an insulator and an electrically conductive permanent magnet causes stress, which sometimes results in, for example, breakage of the magnet. Moreover, since insulating members are interposed between magnet pieces, it takes time and cost for uniformly disposing the insulating members and for manufacturing the rotating electric machine. Furthermore, due to the disposition of insulating members between magnet pieces, the above-mentioned technique brings problems such as a reduction in the properties of magnets.

SUMMARY OF THE INVENTION

The present invention provides a permanent magnet rotating electric machine in which heat damage to a magnet is prevented, eddy current loss is reduced while decreasing an eddy current generated in a permanent magnet, and furthermore, time and cost for manufacturing the rotating electric machine can be reduced.

In the permanent magnet rotating electric machine according to the present invention, a plurality of permanent magnets may be disposed inside or on the surface of a rotor iron core, and the permanent magnets may be annularly arranged side by side at a distance from one another along the circumferential direction of the rotor such that the adjacent permanent magnet may have different magnetic pole direction. Each permanent magnet may comprise an electrically conductive magnet and may comprise an assembly of magnet pieces which may be arranged side by side in the circumferential direction, the axial direction, or both of the circumferential and axial directions of the rotor so that an eddy current generated in the permanent magnet is decreased. Accordingly, an insulating member is not placed between the magnet pieces.

More specifically, the present invention provides a permanent magnet rotating electric machine comprising a stator having a plurality of salient stator poles wound with windings; and a rotor separated from the stator by a rotation air gap and rotatably held, wherein the rotor may comprise a rotor iron core having therein a plurality of permanent magnet insertion holes annularly arranged side by side at a distance from one another along a circumferential direction of the rotor; and permanent magnets inserted into the plurality of the permanent magnet insertion holes such that the permanent magnets in the insertion holes adjacent to each other along the circumferential direction of the rotor have different magnetic pole directions from each other, and wherein the permanent magnets each may comprise a plurality of magnet pieces arranged side by side and may have a structure in which nothing may be interposed between the magnet pieces.

In a permanent magnet having an insulator between magnet pieces, an insulator containing an organic solvent is used as an insulator such as an epoxy resin. However, there may be a problem in that, in a vacuum, the organic solvent evaporates at high temperatures, so that such a permanent magnet cannot be used. In the permanent magnet comprising magnet pieces in the permanent magnet rotating electric machine according to the present invention, evaporation of an organic solvent may not occur at high temperatures and even in a vacuum, so that the permanent magnet can be used without causing a problem.

Moreover, when a permanent magnet is divided as a measure to cope with eddy current and when an insulator or the like is present between the magnet pieces, damage to the permanent magnet may be caused at high temperatures by the difference in the coefficient of expansion and also by a heat resistance problem of the insulator. According to the present invention, nothing is interposed between the divided magnet pieces, and thus it may be possible to relax stress in the magnet, which may be caused by temperature rise, and to provide a heat-resistant magnet in which an eddy current is decreased, and furthermore to reduce cost and processing time significantly.

DETAILED DESCRIPTION OF THE PREFERRED EMBODIMENTS

Figure 1:
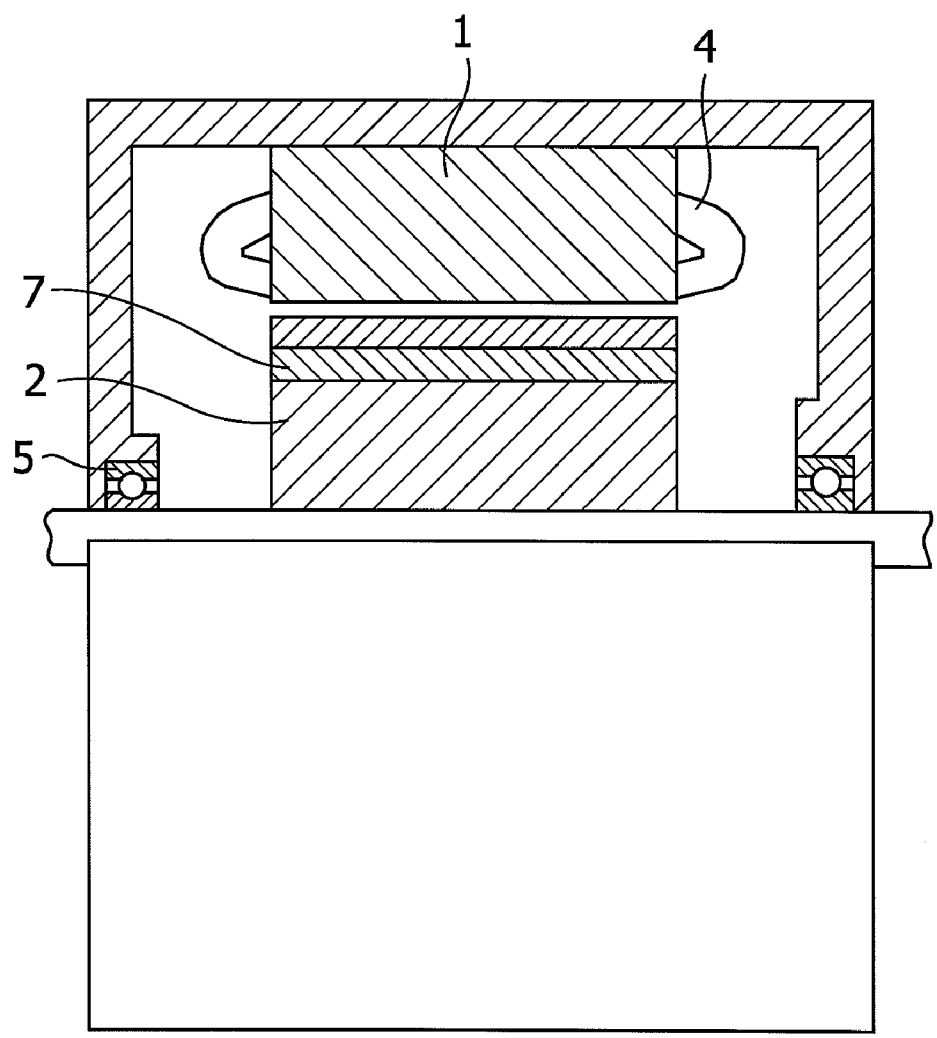
FIG. 1 shows a cross-sectional view of a permanent magnet rotating electric machine.
Figure 2:
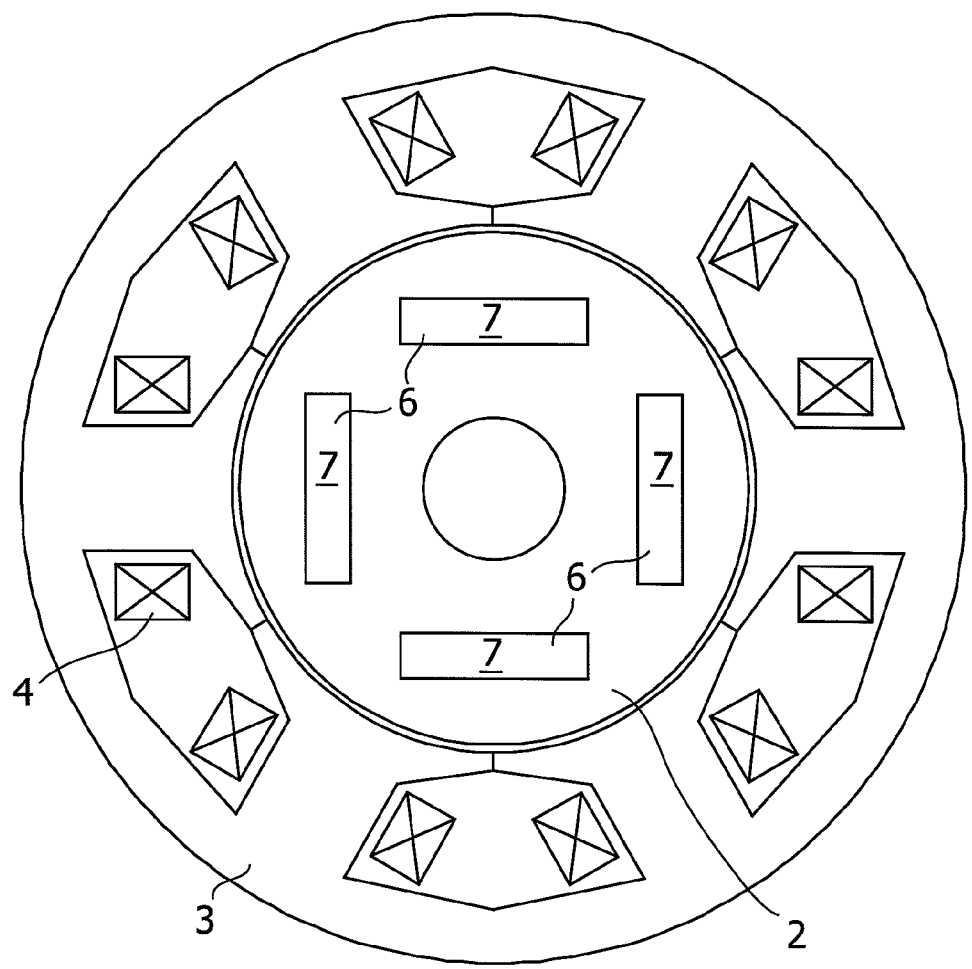
FIG. 2 shows a plan view of a permanent magnet rotating electric machine.

FIG. 1 shows a cross-sectional view of a permanent magnet rotating electric machine, and FIG. 2 shows a plan view of the permanent magnet rotating electric machine.

This embodiment is described using a permanent magnet rotating electric machine in which a stator coil has six poles and a rotor has four permanent magnet poles, however, the present invention also can be applied to those having other numbers of salient poles.

In FIGS. 1 and 2, the permanent magnet rotating electric machine comprises a stator 1 and a rotor 2, and the stator 1 comprises a stator iron core 3 and stator windings 4.

The rotor 2 has a shaft held by bearings 5 and can rotate freely.

Moreover, a plurality of holes 6 for insertion of permanent magnets may be formed in the rotor 2, and the permanent magnets 7 may be inserted into the holes 6 and fixed therein.

Each of the permanent magnets 7 shown in FIGS. 1 and 2 may be preferably divided in the circumferential direction and/or the axial direction, and more preferably divided in the axial direction especially in order to distribute stress. Each of the permanent magnet 7 may be divided only in the circumferential direction.

Figure 3:
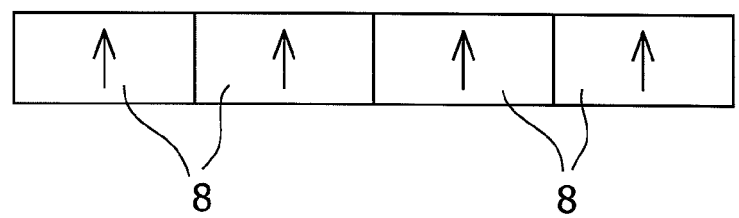
FIG. 3 shows a plan view of magnet pieces in one permanent magnet insertion hole taken along the magnetic pole direction.

The number of divisions may depend on the length of the rotating machine, but it is desirable that a single magnet may be usually divided into 3 to 15 parts in one direction. It should be noted that as shown in FIG. 3, the permanent magnets may be formed such that magnet pieces within a single row may be magnetized in the same direction and arranged parallel to one another.

The magnet pieces which have been obtained by dividing the identical sintered permanent magnet by cutting may be preferable in terms of their good uniformity of magnetization. The sintered permanent magnet may be obtained by molding into a shape which may fit in the size of the permanent magnet insertion holes 6 and by sintering. The sintered permanent magnet may be annealed prior to the division by cutting in order to render the direction of magnetization uniform. The annealing temperature is preferably 150 to 1000° C., more preferably 300 to 900° C.

The method for dividing the sintered permanent magnet may include cutting the sintered permanent magnet with such as a diamond cutter, a wire saw, or a cutting machine with a peripheral cutting edge. These divided magnets can be each individually inserted into the holes 6, or the divided magnets can be integrated by a fixing member and then inserted into the holes 6.

Figure 4:
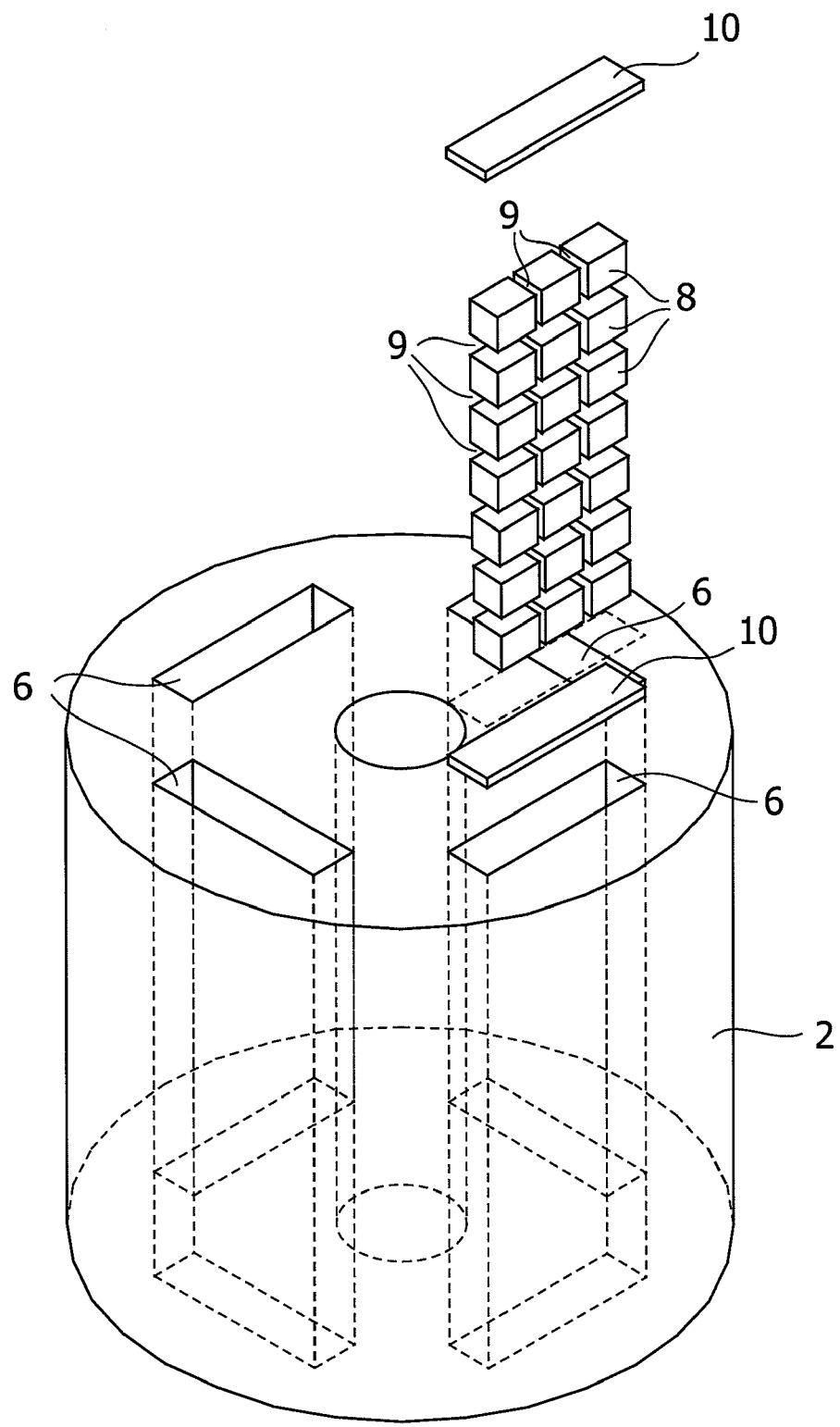
FIG. 4 shows a perspective view of a rotor and an example of a method for inserting magnet pieces into a magnet insertion hole and a method for fixing the magnet pieces.

The method for fixing a plurality of magnet pieces without interposing a substance between them may be a method of using the top and bottom rotor lids 10 when disposing the magnet pieces 8 in the permanent magnet insertion holes 6, as shown in the perspective view of FIG. 4. This method may enable fixation between the magnet pieces 9 especially in the axial direction.

Figure 5:
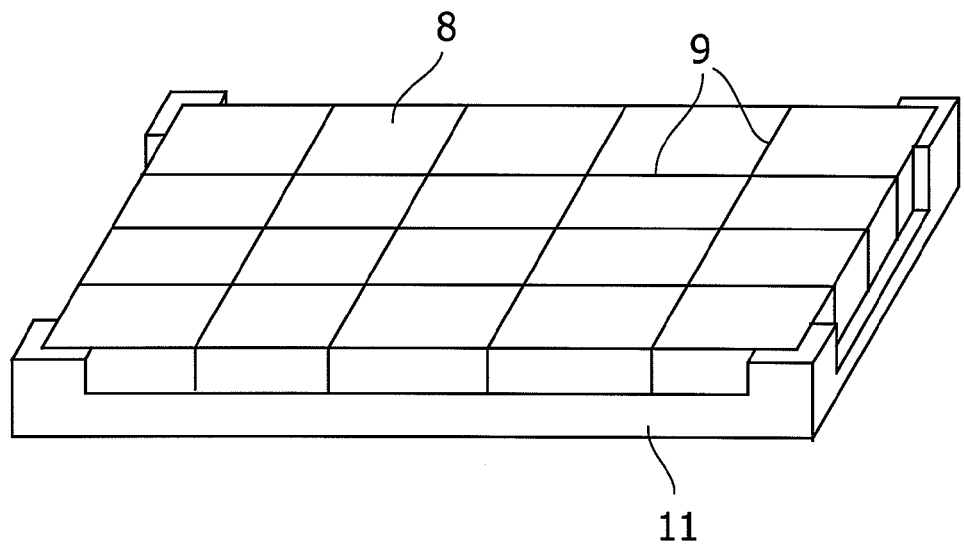
FIG. 5 shows an example of the method for fixing magnet pieces.
Figure 6:
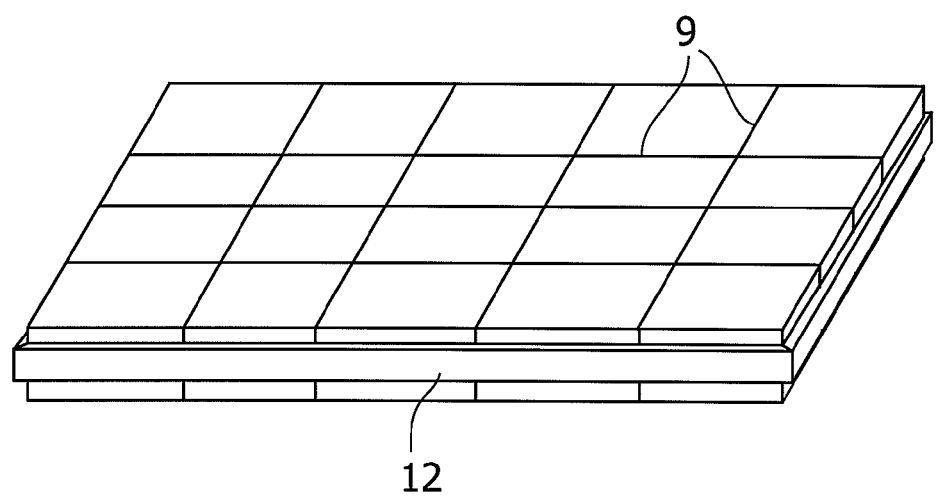
FIG. 6 shows another example of the method for fixing magnet pieces.

Moreover, as shown in FIG. 5, it is also possible to arrange the magnet pieces 8 on a magnet fixing plate 11 without interposing a substance between the magnet pieces. Furthermore, as shown in FIG. 6, it is also possible to fix the magnet pieces in both of the circumferential direction and the axial direction with a magnet fixing band 12 around the magnet pieces to bind them together. Regarding the material of the magnet piece fixing member such as the plate-like fixing case 11 and the fixing band 12 described above, either of magnetic substances and non-magnetic substances can be used, as long as the magnetic field to be generated is not affected, and examples thereof may include aluminum and stainless steel.

As described above, by employing, for example, a configuration as shown in FIGS. 4 to 6, nothing is interposed between the magnet pieces, so that stress due to the difference of expansion coefficient between magnet pieces and the insulating member at high temperatures does not occur, and thus, damage to the magnets can be prevented. Moreover, the magnets may be divided individually, so that eddy current loss can be reduced, and furthermore, it is not necessary to comprise a step of interposing a substance between the magnet pieces, so that the number of steps can be reduced significantly.

Accordingly, even when an electrically conductive permanent magnet is used, it is possible to provide a permanent magnet with which occurrence of stress is suppressed, and furthermore, an eddy current can be decreased and the manufacturing process can be shortened, and it is possible to provide a rotating electric machine in which stress in a magnet caused by temperature fluctuations is considerably reduced.

The operating temperature of the permanent magnet rotating electric machine according to the present invention is preferably 50 to 350° C., and even when the permanent magnet rotating electric machine is operated at a high temperature of 200° C. or more, stress generated inside a magnet can be considerably reduced. The upper limit of the operating temperature can be 350° C., as long as the above-described range is not exceeded.

Hereinafter, the present invention will be described based on a working example, however, the present invention is not limited to this working example.

The permanent magnet rotating electric machine according to the present invention can be used as an electric motor preferably having a rotating speed of 2000 rpm to several tens of thousands rpm and a power of 10 kW to 1 MW.

EXAMPLE 1

A rotating electric machine as shown in FIG. 2 having maximum rotating speed of 7200 rpm was used. A stator was made of a silicon-steel plate. The stator comprised salient stator poles wound with windings. The stator outer diameter was 300 mm and a stator inner diameter was 150 mm. A rotor was made of a silicon-steel plate. The rotor had permanent magnet having dimensions of 60 mm×16 mm×150 mm in each four insertion holes.

For the permanent magnets, a Nd—Fe—B magnet, which was an electrically conductive rare-earth sintered magnet, was used. The magnet had BHmax of 48 MGOe. As shown in FIG. 3, this magnet was divided into three parts in the direction of the dimension of 60 mm and divided into seven parts in the direction of the dimension of 150 mm to make magnet pieces. At this time, the obtained magnet pieces were individually inserted into holes without interposing a substance between the magnet pieces and then fixed using lids made of SUS304.

This rotating electric machine was driven by applying currents having frequencies ranging from 85 Hz to 240 Hz corresponding to rotational speeds of 2550 rpm to 7200 rpm to three-phase windings composed of the stator of this rotating electric machine. The condition of the rotor with regard to damage during this procedure was studied by increasing temperature to 180° C., 200° C. and 240° C.

The rotor using the permanent magnets comprising magnet pieces was not changed at any of temperatures 180° C., 200° C. and 240° C.

Comparative Example 1

A rotor was made in the same manner as in Example 1, except that 100 μm of an epoxy adhesive were applied between magnet pieces and the magnet pieces were stuck together. A rotating electric machine provided with this rotor was assembled, and the rotating electric machine was driven by applying currents having frequencies corresponding to rotational speeds to three-phase windings provided in the rotating electric machine to increase the temperature, and the condition of the rotor with regard to damage during this procedure was studied. The rotor was not changed at 180° C., a color change was observed at 200° C., and the coupling between the magnet pieces was lost and the magnet pieces were separated at 240° C.

EXAMPLE 2

A rotating electric machine whose cross section was as shown in FIG. 2 was used. Each permanent magnet having dimensions of 52 mm×7.5 mm×150 mm was inserted into each of four insertion holes of a rotor having an outer diameter of 200 mm, wherein the rotor was made of a silicon-steel plate. The rated output power of this rotating electric machine was 50 kW at the rated amperage of 200 A. A stator having an outer diameter of 300 mm had salient stator poles wound with windings. The stator was made of a silicon-steel plate.

A Nd—Fe—B sintered magnet having BHmax of 48 MGOe was used as a permanent magnets and divided into three parts in the direction of the dimension of 52 mm and divided into seven parts in the direction of the dimension of 150 mm to make magnet pieces. Divided magnet pieces were then assembled again without interposing a substance between the magnet pieces. Both ends of the magnet were covered with lids of SUS304 and the lids were fixed with bolts to the rotor.

This rotating electric machine was driven at the temperature of 20° C., 180° C., 200° C. and 240° C. respectively by applying rated sinusoidal currents to three-phase windings disposed in the stator. The rotating speed was fixed at the rated speed of 2550 rpm.

The divided magnet pieces were then taken out of the insertion holes, bound with a band, and subjected to measurement of torsional fracture strength by a load cell. The torsional fracture strength refers to the force required for fracturing the magnet in the middle keeping both ends of the magnet fixed.

The measurement was performed for four samples at each temperature and the average of the four samples was calculated. The result is shown in Table 1.

Comparative Example 2

The divided magnet pieces were assembled in the same manner as in Example 2, except that 80 μm of an epoxy adhesive were applied between magnet pieces and the magnet pieces were stuck together. The rotating electric machine was then driven in the same manner as in Example 2. The measurement of the torsional fracture strength was then performed in the same manner as in Example 2. The result is shown in Table 1.

TABLE 1

| Temperature | Example 2 (relative value) | Comparative Example 2 (relative value) |
| --- | --- | --- |
| 20° ž | 1 | 1 |
| 180° ž | 1.01 | 0.9 |
| 200° ž | 0.92 | 0.42 |
| 240° ž | 0.89 | 0.03 |

Table 1 shows that the decrease of the torsional fracture strength of Example 2 due to the increase of the operating temperature was suppressed, while the torsional fracture strength of Comparative Example 2 was drastically decreased.

The invention claimed is:

1. A permanent magnet rotating electric machine which is applicable to operation at not less than 240° C., comprising:
    a stator having a plurality of salient stator poles wound with windings; and
    a rotor separated from the stator by a rotation air gap and held rotatably,
    wherein the rotor comprises:
    a rotor iron core having therein a plurality of permanent magnet insertion holes annularly arranged side by side at a distance from one another along a circumferential direction of the rotor, wherein the permanent magnet insertion holes have opposing open ends;
    permanent magnets inserted into the plurality of permanent magnet insertion holes such that the permanent magnets in the insertion holes adjacent to each other along the circumferential direction of the rotor have different magnetic pole directions from each other; and
    wherein the permanent magnets each comprise a plurality of magnet pieces arranged side by side and have a structure in which nothing is interposed between the magnet pieces, with a removable rotor lid capping each opposing end of the permanent magnet insertion holes.

2. The permanent magnet rotating electric machine according to claim 1, wherein the permanent magnets each comprise a plurality of magnet pieces arranged side by side along the circumferential direction.

3. The permanent magnet rotating electric machine according to claim 1, wherein the permanent magnets each comprise a plurality of magnet pieces arranged side by side along an axial direction of the rotor.

4. The permanent magnet rotating electric machine according to claim 1, wherein the magnet pieces are obtained by dividing the identical sintered permanent magnet.

5. The permanent magnet rotating electric machine according to claim 2, wherein the magnet pieces are obtained by dividing the identical sintered permanent magnet.

6. The permanent magnet rotating electric machine according to claim 3, wherein the magnet pieces are obtained by dividing the identical sintered permanent magnet.

* * * * *